United States Patent

Grosklos

[15] 3,668,252

[45] June 6, 1972

[54] SOLVENT PROCESS FOR AURAMINE AND ETHYL AURAMINE

[72] Inventor: Rill Lewis Grosklos, Williamstown, W. Va.

[73] Assignee: American Cyanamid Company, Stamford, Conn.

[22] Filed: Nov. 22, 1968

[21] Appl. No.: 778,302

[52] U.S. Cl. ........................................................260/566 R
[51] Int. Cl. ........................................................C07c 119/00
[58] Field of Search ............................................260/566 R

[56] References Cited

UNITED STATES PATENTS 3,132,178   5/1964   Weyker et al..........................260/566
3,268,585   8/1966   Grosklos................................260/566

FOREIGN PATENTS OR APPLICATIONS 328,086   9/1957   Japan......................................260/566

OTHER PUBLICATIONS

Lynch et al., J. Am. Chem. Ser., Vol 55 pp. 2515– 20 (1933)
Fierz–David and Blangey, " Fundamental Processes of Dye Chemistry" pp. 298– 299 (1949)

*Primary Examiner*—Leon Zitver
*Assistant Examiner*—Gerald A. Schwartz
*Attorney*—John L. Sullivan

[57] ABSTRACT

The process for the preparation of auramine and ethyl auramine by the reaction of 4,4'-tetramethyldiaminodiphenyl methane and 4,4'-tetraethyldiaminodiphenyl methane, respectively with sulfur, ammonium chloride and ammonia gas is improved by carrying out the reaction in the presence of a solvent selected from the group consisting of ethylene glycol, diethylene glycol, propylene glycol and glycerol at a temperature of from about 125° C. to about 175° C.

4 Claims, No Drawings

SOLVENT PROCESS FOR AURAMINE AND ETHYL AURAMINE

This invention relates to an improved process for the preparation of auramine and ethyl auramine. More particularly, it relates to an improved process whereby the conventional process for auramine is carried in a defined type of solvent.

Auramine is a well-known dye which has been of considerable commercial importance for many years. More recently, for various reasons, including objection to use of auramine as a dye for paper used in food wrapping, the tetraethyl homolog of auramine, hereinafter referred to as "ethyl auramine," has assumed much greater importance. While in the past, therefore, considerable research has been directed towards improved processes for the manufacture of auramine with considerable success, comparatively little attention has been given to improving the ethyl auramine process. In view of the recent increased importance of ethyl auramine, however, greater efforts are being made to improve that process. However, thus far, only limited success has been attained, the main obstacle being that the basic, "conventional," process for auramine is not satisfactory for ethyl auramine, giving little or no product recoverable by practical means. (See Fierz-David and Blangly, Fundamental Processes of Dye Chemistry, 1949, p. 299.) Also, the improvements which have been made in the auramine process are much less successful when applied to ethyl auramine.

Thus, with respect to auramine, the so-called "conventional" process is represented as follows:

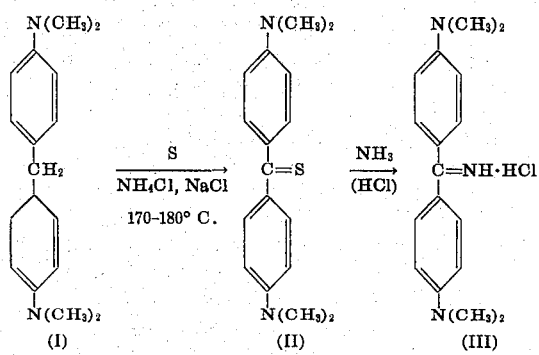

In that process the methane base (I), along with sulfur, ammonium chloride and common salt are heated in a reactor at about 170°–180° C. Salt, which is present as a diluent, is used in large amounts. A thioketone intermediate (II) is formed but not isolated. Anhydrous ammonia gas is continuously introduced into the heated mixture from the outset, whereby the ketonimine is formed. When the evolution of hydrogen sulfide ceases, the hydrochloride salt dyestuff (III) is isolated by salting out from a dilute aqueous solution and filtering. The yield of real auramine (III) provided by this process is about 60 percent of theory based on the methane base starting material (I) as shown by spectrographic analysis of the isolated product.

It should be noted here that although very high yields of auramine are stated in the older literature to have been obtained by this process, modern analytical techniques have not substantiated this. Indeed, the stated yields are in excess of 100 percent (Fierz-David, supra, pps. 298–299) and thus are either wrong or were calculated on some basis other than the starting methane base.

When applied to ethyl auramine, however, the process gave little or no yield of product.

A subsequent improved process for auramine is that described in U.S. Pat. No. 3,132,178. By that process a part or all of the sodium chloride employed in the conventional process, as diluent, was replaced by urea, whereby the yield of auramine was substantially increased, i.e., up to 85 percent of theory. Also, when applied to ethyl auramine the process gave substantial yields of ethyl auramine, up to about 70 percent of theoretical, as shown by product analysis. However, in that case, only about 70–75 percent of this yield was recoverable in substantially pure form by the salting out isolation procedure there employed, the remainder being inseparable from the tarry product filter cake.

A more recent improved process for auramine is that described in U.S. Pat. No. 3,268,585. In that process sulfamic acid and urea, along with sulfur, were reacted with the methane base. That process provided yields of pure, recoverable auramine as high as 91 percent of theory. The application of that process to ethyl auramine also resulted in improved yields up to about 83.0 percent of theory as shown by analysis of the tarry product filter cake. Here again, however, the yield of dye product recoverable from the filter cake was only about 62 percent of theoretical.

Thus, while substantial yields of ethyl auramine were formed in the aforesaid improved processes, i.e., about 70 percent and about 83 percent respectively, a substantial portion of the ethyl auramine was retained in the tarry residue from which the main body of product had been removed. The part of the product remaining in the tarry residue was evidently present in insoluble form and, therefore, was not recoverable by isolation procedure there employed. Thus, there, the product was isolated by "drowning" the reaction mass with water, filtering the drowning mixture and then extracting the resulting "solid cake" with hot water leaving a "tarry cake" which contained the additional insoluble ethyl auramine. From the combined drowning filtrate and hot water extract, after cooling, the ethyl auramine, as the hydrochloride, was salted out with sodium chloride and recovered by filtration. Due to the non-recovery of the ethyl auramine which was retained in the tarry cake, however, the actual recovered yields of ethyl auramine from the two processes amounted to only about 55 percent and about 62 percent of theoretical, respectively.

Subsequently, the present applicant devised an isolation procedure whereby a substantially increased recovery of ethyl auramine was attained. Thus, by employing that procedure, the yield of isolated dye product from the said processes was increased by about 25 percent. That procedure, which involves the application of a "basification" step followed by an "acid-extraction" step, is disclosed and claimed in a copending application, Ser. No. 594,668, of this applicant now U.S. Pat. No. 3,557,212.

It will be appreciated that the foregoing processes leave much to be desired from the standpoint of yields attainable and the isolation procedure required. In view of the current increased demand for ethyl auramine, therefore, there is a pressing need for a process of greater efficiency and economy. The present invention provides such a process.

In accordance with the present invention it has been found that when the "conventional" process for the manufacture of auramine is applied to ethyl auramine markedly improved yields of ethyl auramine, in useful, readily recoverable form, are obtained, provided that the reaction is conducted in the presence of a solvent selected from the group consisting of ethylene glycol, diethylene glycol, propylene glycol and glycerol. Thus, product yields as high as 87 percent of theoretical are obtained in the process and only a simple isolation procedure, such as drowning the reaction mass in hot water, filtering the hot extraction mixture, washing the liquor from the filter cake with more hot water and salting the product from the combined filtrate and washings as the hydrochloride salt. Furthermore, no urea or sodium chloride (diluent) need be used in the reaction as in the process of U.S. Pat. No. 3,132,178; nor need any sulfamic acid be used as in the process of U.S. Pat. No. 3,268,585. Also, the temperature required for the conduction of the reaction is considerably lower than those required for the processes of these patents. Thus, temperatures of from about 125° to about 175° C. are suitable with the preferred temperature being about 140° C. since at this temperature the reaction is completed in a reasonable period of time with a minimum of side reactions.

The amount of solvent used in the process will generally be from about 0.4 to about 4.0 parts thereof per part of the ethyl methane base. Although greater amounts of solvent may be employed no advantage would be provided thereby.

Conventional amounts of sulfur and ammonium chloride are employed in the new process. Thus, from 0.42 to 0.80 parts of sulfur and from 0.27 to 0.45 parts of ammonium chloride per part of ethyl methane base can be used. Typically, the new process employs 124 parts of ethyl methane base, 52 parts sulfur, 44 parts ammonium chloride and 150 parts of solvent.

In conducting the process the reactants and solvent are mixed together. Then, while bubbling anhydrous ammonia gas therethrough, the mixture is heated at reaction temperature for a time to complete the reaction. At 140° C. this is usually about 20 hours. The mixture is then drowned in hot water, and the hot extraction mixture is filtered. The ethyl auramine, as the hydrochloride, is then isolated from the extract by salting out with sodium chloride.

The invention is further illustrated by the examples which follow.

PREPARATION OF ETHYL AURAMINE

EXAMPLE 1

150 g. ethylene glycol, 124 g. 4,4'-tetraethyldiaminodiphenylmethane and 64 g. crushed sulfur are added to a reactor with stirring. With anhydrous ammonia gas bubbling through the batch, the charge is heated to 140° C. in ½ hour. After stirring 4 hours at 140° C., 44 g. anhydrous ammonium chloride is added and the mixture stirred another 16 hours at 140° C.

The reaction mass is then extracted with 7,000 g. of water at 65° c. containing 75 g. filter aid and 10 g. acetic acid, clarified, the tar cake washed with more 65° C. water, and the product salted out of the combined filtrate and washings by the addition of sodium chloride. After filtering and drying, 129.8 g. of dye product analyzing by visible spectrophotometry (VS) 96.6 percent real ethyl auramine (87.2 percent of theoretical) were obtained.

EXAMPLE 2

A mixture of 124 g. of 4,4'-tetraethyldiaminodiphenylmethane (ethyl methane base), 52 g. sulfur, 44 g. ammonium chloride and 150 g. ethylene glycol was stirred at 140° C. for 18 hours. Ammonia gas was bubbled through the reaction mixture during this time. The whole mixture containing the dye was then extracted with 7 liters of water at 65° C. containing 75 g. of a filter aid and 10 g. acetic acid, clarified, the tar cake washed with 2 liters more of water at 65° C. containing 1 g. acetic acid, and the dye salted out of the combined filtrate and washings by addition of sodium chloride. After filtering and drying, 121.2 g. of dye product analyzing 99.5 percent real ethyl auramine by VS (83.8 percent of theoretical) were obtained.

EXAMPLE 3

The procedure of Example 2 was repeated, except that 150 g. of propylene glycol were used in place of the 150 g. of ethylene glycol used in Example 2. In this case 105.3 g. of dye product assaying 95.0 percent real dye by VS (69.7 percent of theoretical) were obtained.

EXAMPLE 4

The procedure of Example 2 was repeated, except that diethylene glycol was used in place of the ethylene glycol. In this instance, 107.9 g. of dye product assaying by VS 94.8 percent real dye (71.1 percent of theoretical) were obtained.

EXAMPLE 5

A mixture of 150 g. of glycerol, 124 g. of 4,4'-tetraethyldiaminodiphenylmethane (ethyl methane base) and 64 g. of sulfur was prepared. Bubbling of ammonia into the mixture was started and it was heated to 140° C. in ½ hour. A temperature of 140° C. was maintained for 20 hours, 22 g. of ammonium chloride being added to the batch at the 4½ hour point. The whole mixture was then extracted in water and processed as described in Example 1. 113.7 g. of dye product assaying 96.5 percent real ethyl auramine by VS (76.3 percent of theoretical) was obtained.

PREPARATION OF AURAMINE

EXAMPLE 6

150 g. ethylene glycol, 102 g. 4,4'tetramethyldiaminodiphenylmethane (methane base) and 51 g. crushed sulfur are charged to a reactor with stirring. With anhydrous ammonia gas bubbling through the batch, the charge is heated to 140° C. in ¼ hour and stirred 4 hours at 140° C.; 44 g. anhydrous ammonium chloride is added and the charge is stirred an additional 16 hours at 140° C.

After the 20 hour reaction period at 140° C., the mass was extracted with 7,000 g. water at 65° C. containing 75 g. of filter aid and 10 g. acetic acid, clarified, the tar cake washed with more 65° C. water, and the product salted out of the combined filtrate and washings by the addition of sodium chloride. After filtering and drying, 133.0 g. of dye product assaying 88.8 percent real auramine (97.0 percent theory) was obtained.

EXAMPLE 7

150 g. ethylene glycol, 102 g. 4,4'-tetramethyldiaminodiphenylmethane (methane base), 64 g. crushed sulfur, and 39 g. anhydrous ammonium chloride are charged to a reactor with stirring. With anhydrous ammonia gas bubbling through the batch, the charge is heated to 140° C. in ½ hour and stirred 20 hours at 140° C. The reaction mass was diluted with 75 g. ethylene glycol to keep it fluid, cooled to room temperature and filtered. Assay of the filtrate showed 5.48 g. real auramine (4.5 percent theory) in solution which could be recycled into subsequent reactions and therein recovered.

The crude cake was slurried in 2-3 times its weight of mixed xylenes at 90°–100° C., filtered hot, and washed with more hot xylene to remove the sulfur. After drying the cake, 122.5 g. of dye powder assaying 94.4 percent real auramine was obtained (95.0 percent of theory). This 95.0 percent isolated plus the 4.5 percent recoverable yield in the glycol filtrate totals 99.5 percent total theoretical yield.

As evidenced by the foregoing examples, the new solvent process of the instant invention represents a marked improvement over the prior processes for the preparation of ethyl auramine. Thus, the yields of ethyl auramine in readily recoverable useful form are greatly increased particularly using ethylene glycol as solvent over these provided by the process of U.S. Pat. No. 3,132,178; and these yields are substantially equal to and, in the case of ethylene glycol, substantially greater than those obtainable by the tedious and more expensive isolation procedure of copending application Ser. No. 594,668.

Similarly, the use of the solvent greatly improves the process for auramine. Thus, while the process of U.S. Pat. No. 3,268,585 provided yields of auramine as high as 91 percent using urea and sulfamic acid as reagents, the present process provides yields of 97–99 percent and it does not require the use of those reagents.

A further important advantage of the process is the fact that the main body of the auramine product can be readily separated from the glycol (or glycerol) solvent by cooling and filtration and worked up using a non-aqueous (anhydrous) solvent (see Example 7). This permits the glycol solvent containing small amounts of product dye along with unreacted starting materials or intermediates to be recycled to succeeding batches, thus reducing the net raw material usage to near theoretical. Also, there is no aqueous effluent waste to add to water pollution.

Furthermore, the use of the solvent in both the auramine and ethyl auramine processes eliminates the air pollution problem encountered in the urea process of U.S. Pat. No. 3,268,585. Thus, whereas that process generates off-gases containing carbonyl sulfide, hydrogen sulfide and ammonia which are difficult to scrub, the off-gases from the present (solvent) process can be readily scrubbed so that discharge of noxious fumes to the atmosphere is eliminated.

The use of a liquid solvent in the preparation of both auramine and ethyl auramine has been disclosed in the prior art. Thus, Endo, et al. (Japanese Pat. No. SHO328086–57, C.A. 52, 13798 (1958)) shows the use of a huge amount of a chlorinated hydrocarbon, such as O-dichlorobenzene, as solvent. Although the attainment of what appears to be a 90 percent yield of ethyl auramine is there indicated, it has since been demonstrated that the indicated yields are, in fact, not obtainable by that process. Also, the use of various solvents, including ethylene glycol and propylene glycol, for the preparation of the intermediate thioketone (4,4'-tetramethyldiaminothiobenzophenone) in the auramine process and subsequent conversion of the thioketone to auramine in a large amount of a solvent, such as naphthalene, is also disclosed (J. Am. Chem. Soc. 55, 2515 (1933)). However, the use of a glycol solvent throughout the process and the excellent results thereby provided are nowhere suggested in the art.

I claim:

1. In the process for the preparation of a compound having a formula selected from the group consisting of

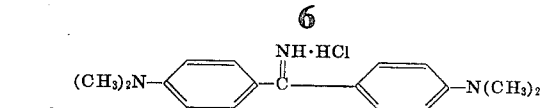

and

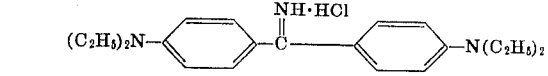

by the reaction of a compound having the formula selected from the group consisting of

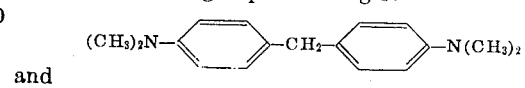

and

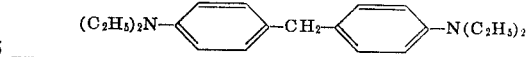

with sulfur, ammonium chloride and ammonia gas, the improvement which comprises carrying out said reaction in the presence of a solvent selected from the group consisting of ethylene glycol, diethylene glycol, propylene glycol and glycerol at a temperature of from about 125° C. to about 175° C.

2. The process of claim 1 wherein the solvent is ethylene glycol.

3. The process of claim 2 wherein the compound employed in the reaction is the compound of the formula

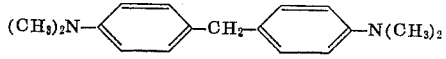

4. The process of claim 2 wherein the compound used in the reaction is the compound of the formula

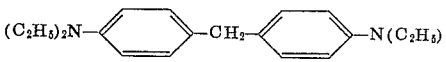

* * * * *